(No Model.)

C. Q. HAYES.
SHAFT COUPLING.

No. 251,878. Patented Jan. 3, 1882.

Attest:
R. J. Barnes
L. W. Seely

Inventor:
Calvin Q. Hayes
by Elias Spear
Attorney.

UNITED STATES PATENT OFFICE.

CALVIN Q. HAYES, OF SEDALIA, MISSOURI.

SHAFT-COUPLING.

SPECIFICATION forming part of Letters Patent No. 251,878, dated January 3, 1882.

Application filed July 18, 1881. (No model.)

*To all whom it may concern:*

Be it known that I, CALVIN Q. HAYES, of Sedalia, in the county of Pettis and State of Missouri, have invented a new and useful Improvement in Shaft-Couplings; and I do hereby declare that the following is a full, clear, and exact description of the same.

My invention relates to shaft-couplings, and is an improvement upon the coupling shown in Letters Patent granted to me on the 2d day of March, 1880, and numbered 225,126.

The improvements relate to certain details of construction hereinafter fully described, and specifically indicated in the claims.

Figure 1:
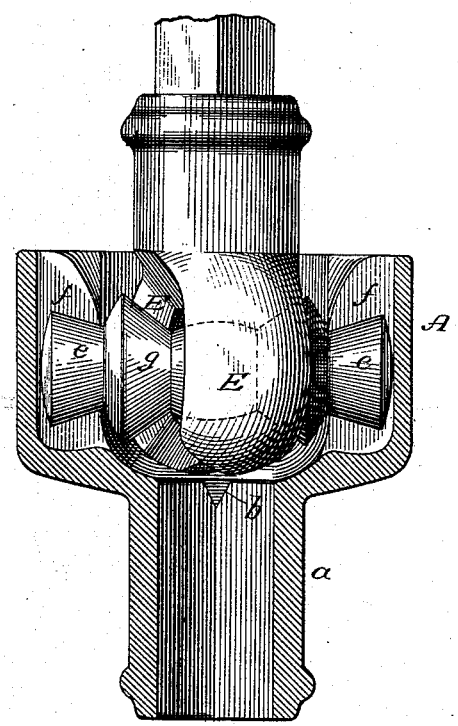
Figure 3:
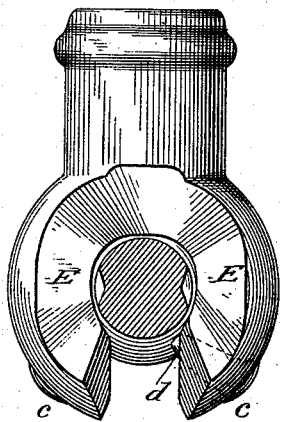
Figure 2:
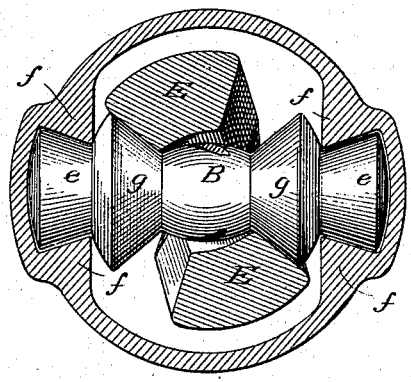
Figure 4:
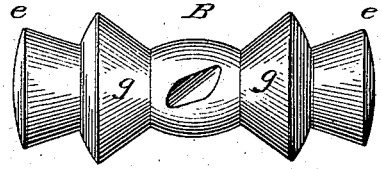

In the drawings hereunto attached, Figure 1 is a central longitudinal section of the socket part of the coupling, and Fig. 2 a transverse section. Fig. 3 represents that part of the coupling which carries the arms, the arms being in section. Fig. 4 represents the roller.

I form the socket part of the coupling with a sleeve, $a$, cast with the socket A. In the sleeve is a central and preferably rectangular opening for the end of the shaft to which the coupling is connected. This opening extends the entire length of the sleeve and into the socket; but in order to prevent the tumbling rod or shaft from passing through into the socket, I form in casting two small projections or stops, $b\ b$, on opposite corners and at the bottom of the socket. The corners of the shaft bear against these stops or projections, and the shaft is thereby prevented from extending into the socket and interfering with the operation of the coupling.

In order to prevent the arms from being crowded too far into the socket when the shafting and couplings are put up, I provide wooden plugs $c\ c$, which are inserted in holes made approximately radial in the inner ends of the arms. These plugs project slightly, and obviously when the arms are inserted in the socket the plugs prevent them from crowding in too far and leave the joint in free working order.

Another effect may be produced by one or both of these plugs by allowing them to pass through the arms, as shown on one side at $d$. The plug being inserted after the roller has been slipped in will prevent it from slipping out when the coupling is put up. It is sufficient for the purpose that only one plug should extend through to act as a stop for the roller. The roller itself is somewhat improved in form over that shown in my said patent. In that patent the roller was made with a simple conical head on each end. The conical head was held behind inclined projections on the inside of the socket, which conical heads were adapted to bear against the projections in the sides of the socket, the arms of the bifurcated shaft bearing upon the central part of the spool-shaped roller.

In this improved coupling I form upon the ends of the anti-friction roller double cones, whereby the roller is provided with its proper bearings against the projections on the inner face of the socket, and also the bearings for the sides of the arms of the bifurcated part of the coupling. The roller is indicated at B, and the extreme ends, formed in conical shape, are shown at $e\ e$, these ends having their bearings within the projections $f\ f$. The conical parts $g\ g$ are inside of the projections and serve to guide the roller and hold it accurately in place. The faces of the cones which are toward the arms E E serve as bearing-surfaces for those arms, which are inclined to adapt them to bear evenly against the conical parts last named.

By this improvement not only is the roller held evenly and accurately in place under all circumstances, but the bifurcated arms have even bearings on the roller, whereby great strength is secured and perfect freedom from binding and the least possible amount of friction. In other respects the coupling is like that shown in my said patent and need not be further described.

I am aware that means have heretofore been devised for preventing the rod or shaft from entering the socket of the couplings by reducing the size of the opening, thereby forming shoulders against which the shaft or rod rests, and I do not claim such.

Having thus described my invention, what I claim is—

1. The combination of the socket having projecting bearings or bearings in the projections with the roller provided with or having inclined bearing-faces $g\ g$ and $e\ e$ and the arms, substantially as described.

2. The combination, with a socket and arms, of the wooden pins adapted to prevent undue crowding of the parts, substantially as described.

3. The combination of the arms, the roller, and the wooden pin projecting inwardly, whereby the roller is retained in place when set up, substantially as described.

4. The combination, with the socket part of the coupling, of the sleeve *a*, provided with central perforation, and projections or stops *b b*, arranged in opposite corners, substantially as described.

In testimony whereof I have signed my name to this specification in the presence of two subscribing witnesses.

CALVIN Q. HAYES.

Witnesses:
TIMOTHY COLLINS,
E. E. CLARK.